(12) United States Patent
Kannan (10) Patent No.: US 9,294,879 B2
(45) Date of Patent: Mar. 22, 2016

(54) DETERMINING PATH TRAVERSED BY A MOBILE COMMUNICATION DEVICE

(76) Inventor: Sriram Kannan, Bangalore (IN)

(*) Notice: Subject to any disclaimer, the term of this patent is extended or adjusted under 35 U.S.C. 154(b) by 131 days.

(21) Appl. No.: 14/233,753

(22) PCT Filed: Aug. 3, 2011

(86) PCT No.: PCT/IB2011/053464
§ 371 (c)(1),
(2), (4) Date: Jan. 19, 2014

(87) PCT Pub. No.: WO2012/176022
PCT Pub. Date: Dec. 27, 2012

(65) Prior Publication Data
US 2014/0213305 A1    Jul. 31, 2014

(30) Foreign Application Priority Data
Jun. 20, 2011    (IN) .............................. 2074/CHE/2011

(51) Int. Cl.
G01S 5/02    (2010.01)
G01S 5/00    (2006.01)
H04W 4/02    (2009.01)
H04W 64/00    (2009.01)

(52) U.S. Cl.
CPC .............. *H04W 4/028* (2013.01); *G01S 5/0027* (2013.01); *G01S 5/0054* (2013.01); *G01S 5/0252* (2013.01); *G01S 5/0294* (2013.01); *H04W 4/025* (2013.01); *H04W 64/00* (2013.01)

(58) Field of Classification Search
CPC ... G01S 5/0252; G01S 5/0054; G01S 5/0294; G01S 5/08; H04W 4/02; H04W 64/00; H04W 4/028; H04L 67/18
See application file for complete search history.

(56) References Cited

U.S. PATENT DOCUMENTS

| | | | | |
|---|---|---|---|---|
| 2007/0210961 A1* | 9/2007 | Romijn | ................. | G01S 5/0289 342/464 |
| 2009/0005972 A1* | 1/2009 | de Koning | ............. | G01C 21/30 701/532 |
| 2011/0051665 A1* | 3/2011 | Huang | ................. | G01S 5/0027 370/328 |
| 2011/0081922 A1* | 4/2011 | Chandra | ............. | H04W 64/006 455/457 |

* cited by examiner

*Primary Examiner* — Nam Huynh
(74) *Attorney, Agent, or Firm* — Rajeev Narang (57) ABSTRACT

The invention provides a method and system for determining path traversed by a mobile communication device in an unobtrusive manner. The method involves providing a tower transition data involving identifying a set of GPS coordinates associated with a cellular network tower ID, and identifying the tail GPS coordinate and head GPS coordinate of consecutive cellular network tower IDs. Then the distance between the tail and head is estimated, based on which the sequence of cellular network tower IDs are determined, which provides the path traversed by the mobile communication device.

13 Claims, 6 Drawing Sheets

DETERMINING PATH TRAVERSED BY A MOBILE COMMUNICATION DEVICE

TECHNICAL FIELD

The present invention describes a method of determining the path traversed by a mobile communication device using sequence of cellular network tower IDs.

BACKGROUND

Knowing the location of a mobile communication device at any given point of time is useful and sometimes necessary information for a variety of reasons. This may be for safety reasons, or for planning next set of actions, or many other reasons. Currently, a few techniques are available to locate a mobile communication device, and/or track a path taken by the mobile communication device.

DE3827352 describe a method to determine the instantaneous location of a mobile station. Here a mobile radio station buffer receives data messages from at least 3 stationary radio stations and these are stored in a computer in the mobile station. The instantaneous location is determined by computing the propagation time differences between the transmission and reception of respective data messages which are stored in a computer in stationary radio stations.

Location can also be determined, as described in patent WO98058459, by coding the mobile communication network as a several digit number via a base station which momentarily supplies the mobile station and attaching it to the call number of the subscriber as an extension number. This extended call number is used to connect through an information centre to which a subscriber communicated through the mobile connection network. The location related information is then transmitted from the information centre to the subscriber.

U.S. Pat. No. 6,314,296 describes the use of a wireless communication apparatus which receives identification information of a wireless base station to which the apparatus is connected. The position of the base station is stored in the memory of the apparatus. The position information of the calling side can be notified to the called side.

US20090005972 provides a method to determine the location or direction of travel. According to this invention a device is located by comparing user's measured cellular transition patterns with a map that contains measured distinct characteristics of a cellular-radio signal and a model of road networks. Cellular transitions are registered when a device or a vehicle is moving through various cellular or radio networks. The sequence of transitions is used in creating a map. It is then matched with the model of road networks previously generated. Location is determined by independent measurement and cross-referenced as a function of time.

DE19721504 describes a method for position determination using GPS coordinates. Here, a mobile communications device (MS) is used as a peripheral for a positioning system, which calculates the position of the mobile communications device from the known positions of at least one (preferably three) base stations with which it is in radio communication and the relative spacing of the mobile communications device from each base station. The resulting position information is displayed at the mobile communications device. The positions of the base stations are determined via a global positioning system, the spacing of the mobile communications device from each base station determined from the propagation time of the transmitted radio signals.

A slightly different approach to determine location of a device using GPS was described in US20010018344. Here each base station is assigned a unique code. When a mobile station is interacting with a base station its code is recorded along with the position coordinates of a geographic feature as determined by GPS coordinates. The sequence of coordinates and times are used to determine the movement of data.

All the techniques described herein require sophisticated instrumentation to obtain accurate position information, or else the position information is generally inaccurate. There is still a dire need in the art to obtain position information of a mobile communication device using simple devices to a great degree of accuracy without ambiguity in a relatively inexpensive manner.

BRIEF DESCRIPTION

In one aspect, the invention provides a method for generating a tower transition data, the method comprising: receiving at least two cellular network tower ID; receiving at least one GPS coordinate for each cellular network tower ID periodically; and identifying a head GPS coordinate and a tail GPS coordinate associated with at least one pair of cellular network tower ID to generate tower transition data.

In another aspect, the invention provides a method for determining a path traversed by the mobile communication device, the method comprising: providing a tower transition data; receiving at least two cellular network tower IDs sequentially; identifying at least one head GPS coordinate and at least one tail GPS coordinate associated with each transition between two consecutive cellular network tower IDs from the tower transition data; estimating a distance between each tail GPS coordinate and each head GPS coordinate between two consecutive transitions; selecting at least one most probable transition associated with a minimum distance between two consecutive transitions; and determining the path traversed by the mobile communication device based on the at least one most probable transition.

In yet another aspect, the invention provides a method for constructing a path to be taken by a user wherein the method comprises: providing a start location GPS coordinates and an end location GPS coordinates; providing a tower transition data; and selecting at least one most probable transition between the start location GPS coordinate and end location GPS coordinates from the tower transition data.

In a further aspect, the invention provides a system for determining path traversed by a mobile communication device, the system comprising: a mobile communication device in communication with at least one cellular network tower, wherein the mobile communication device is associated with at least one GPS coordinate; a recording module for recording the at least one cellular network tower ID; a processing module for processing the at least one cellular network tower ID, wherein the processing module comprises a tower transition data; a communication module to enable communication between the mobile communication device, the recording module and the processing module.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein and in the claims, the singular forms "a," "an," and "the" include the plural reference unless the context clearly indicates otherwise.

As used herein, Global Positioning System (GPS) is a satellite navigation system which provides information on location and time of a person or an object anywhere on or near earth. The location from a GPS is made available in the form of co-ordinates. These co-ordinates may be represented similar to a three dimensional Cartesian co-ordinate system i.e. (x,y,z). Further, altitude or depth information may also be made available using GPS relative to sea level. Alternately, GPS co-ordinates may be represented in the form of latitude and longitude based on an angular coordinate system where degrees of latitude and longitude measure the angle between a location and the reference line, namely the equator for latitude and the prime meridian for longitude. Other forms of representations of position and time information will become known to those skilled in the art, and is contemplated to be within the scope of the invention. It is useful for tracking any moving or stationary object. It typically makes use of a separate device that is capable of giving GPS related information. Alternately, some mobile communication devices are equipped with GPS functions.

As used herein, mobile communication device means an electronic device that is capable of two-way communication over a cellular network. Communication may be voice-based, or may be limited to only sending and receiving short message services (SMS), multi-media message service (MMS), General Packet Radio Service (GPRS), and the like, and combinations thereof. The mobile communication device is also capable of wide range of functions, such as storing phone numbers, address books, calendars, displaying time and date, alarm functions, web browsing, etc. The capabilities and capacities of a given mobile communication device depends on the make and model of the device. Some of the functions may require permissions from cellular operator, and may operate through the cellular network tower, while others are independent of the cellular operator and cellular network tower, and are entirely user defined and controlled.

A cellular network is a radio network distributed over land areas called cells, each served by at least one fixed-location transceiver known as a cell site. The cellular network is operated by a cellular operator, and for a mobile communication device to function, permission has to be obtained from the cellular operator in the form of subscriptions. One of ordinary skill in the art will be aware that more than one cellular operators can operate in an area. Typically, a mobile communication device is associated with a single cellular operator, however, subscription from more than one cellular operator is also possible. As used herein, user is a person in possession of and using a mobile communication device.

Each cellular network tower is identified by a unique identifier. In one exemplary embodiment, the unique identifier for a cellular network tower comprises four components: MCC, MNC, LAC, CID, wherein MCC stands for a country code, MNC stands for a cellular network code, LAC stands for a location area code, and CID stands for the cellular network tower's unique ID. Other forms of unique identifiers for a cellular network tower are also known, and use of this identifier is contemplated within the scope of the invention. On some mobile communication devices, it is possible to programmatically query the unique identifier of a cellular network tower to which the mobile communication device is communicating with at any point in time. Knowing the unique identifier of the cellular network tower, it is possible for the user of the mobile communication device to find out the location of the cellular network tower in one of the following methods: in one method, based on information provided by cellular operator to which the cellular network tower belongs; alternately, in another method a short string representing the location of the cellular network tower is typically sent to the mobile phone through a special mechanism called the cell broadcast service (CBS), which string is capable of being read on some mobile communication devices through the use of appropriate programs.

The number of cellular network towers in a given area of region is determined by a cellular operator. The considerations for the number of cellular network towers may include for example, the number of users in a given area, the nearest next available cellular network tower, the volume of calls faced by a cellular network tower, and the like. A mobile communication device at any given location may be within the vicinity of one or more than one cellular network towers. But only one cellular network tower will actually be in contact with the mobile communication device at a given point of time. While stationary or in motion, the mobile communication device will be transferred from one cellular network tower to another cellular network tower based on a variety of considerations, such as signal strength, volume of calls, and the like. The transfer is achieved through a process commonly known in the art as "handing over" or "handing off." The transfer of mobile communication device from one cellular network to the other is referred as tower transition.

Figure 1:
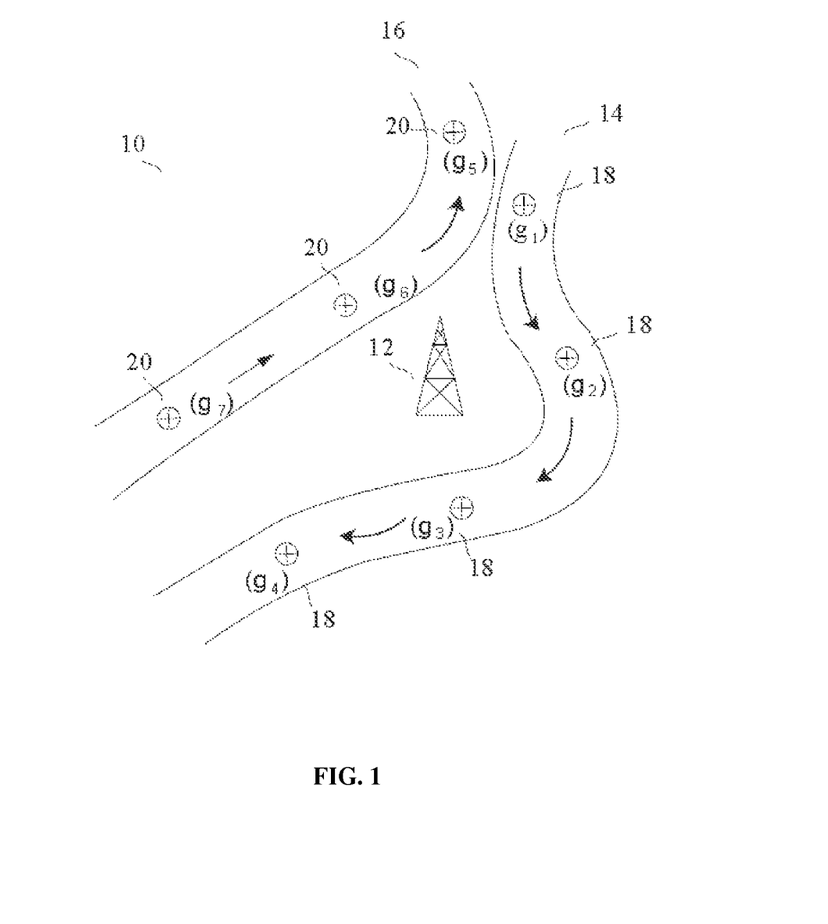
FIG. 1 shows a schematic of an exemplary cell for an exemplary cellular network tower.

FIG. 1 shows a schematic of an exemplary cell 10 for an exemplary cellular network tower 12. In this exemplary depiction, two distinct routes 14 and 16 are shown. If GPS coordinates of a first mobile communication device traversing through the first route 14 are recorded periodically, the exemplary coordinates depicted by numeral 18, namely g1, g2, g3 and g4 will be recorded. The periodicity of recording the GPS coordinates depend on various factors, and may be, for example, every 1 second, or every 10 second, or every 1 minute. Similarly, if the GPS coordinates of a second mobile communication device traversing through the second route 16 are recorded periodically, the exemplary coordinates depicted by numeral 20, namely g5, g6, and g7 will be recorded. Thus, as can be seen, a single cellular network tower may be associated with a plurality of GPS coordinates, and also a plurality of sequence of GPS coordinates depending on the route taken by the mobile communication device. For purposes of illustration and explanation, a mobile communication device is shown to be in contact with a single cellular network tower. However, one skilled in the art will recognize at a given location, a mobile communication device may be in contact with more than one cellular network tower over a period of time. The handing off from one cellular network tower to another cellular network tower occurs on the basis of several factors that may include, for example, call volume, proximity of the mobile communication device to the cellular network tower, and the like, and combinations thereof.

Figure 2:
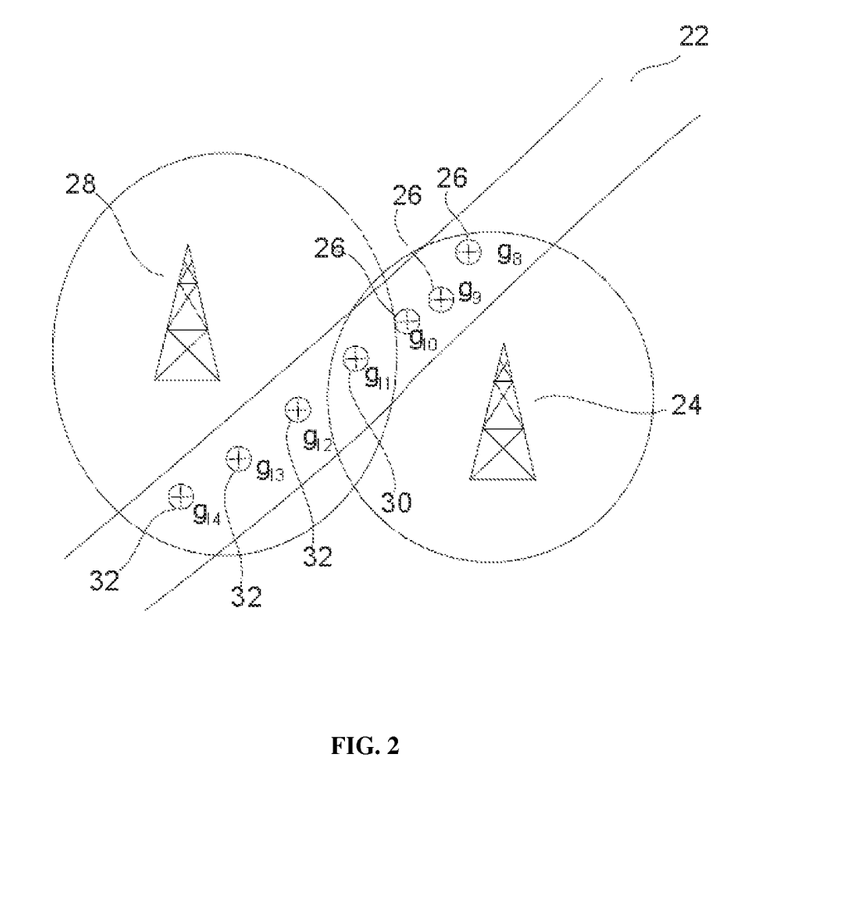
FIG. 2 shows an exemplary situation involving a mobile communication device traversing through a route.

FIG. 2 shows an exemplary situation involving a mobile communication device traversing through a route 22. It comes into contact with a first cellular network tower 24. For illustration purposes, in FIG. 2 and in subsequent figures, the cell coverage of each cellular network tower is shown to be circular in shape, however, in reality the actual shape may vary from this. When the GPS coordinates are recorded once it enters into the cell covered by the first cellular network tower 24, the coordinates depicted numeral 26, namely g8, g9, and g10 are recorded. Then, in the region which overlaps with the first cellular network tower 24 and the second cellular network tower 28, the GPS coordinate depicted by numeral 30, namely g11 is recorded. Subsequently, as the mobile communication device traverses into the region covered by the second cellular network tower 28, the GPS coordinates depicted by numeral 32, namely g12, g13 and g14 are recorded. Depending on the exact conditions prevalent at a given region, the GPS coordinate g11 (30) may be associated with either the first cellular network tower 24 or the second cellular network tower 28. The exact cellular network tower identity may be easily determined without undue experimentation by one of ordinary skill in the art. The movement from one location to another causing a change from a first cellular network tower to the second cellular network tower associated with the mobile communication device is referred to herein as transition.

As used herein, a gchain is a sequence of GPS coordinates associated with a cellular network tower transition. The gchain associated with a tower transition from tower1 to tower2 consists of a ghead which is the first GPS coordinate while in contact with tower1 in the sequence of GPS coordinates associated with the cellular network tower transition to tower2, and gtail which is the last GPS coordinate just before getting into contact with tower2, in that sequence. It is possible for a cellular network tower to have more than one gchain as the area covered by a cellular network tower will have multiple regions and thus covering several possible pathways. It is also possible for the same tower transition to have multiple distinct gchains associated, as the same two towers could potentially be visited in sequence on a totally different path nearby that is nearby. As used herein, a gcloud comprises all the gchain's that are covered by a single cellular network tower. Table 1 gives an exemplary manner of recording cellular network tower IDs and associated GPS coordinates in a suitable manner for the situation shown in FIG. 2. Such a representation of data is referred to herein as Towers Table.

TABLE 1

| Tower ID | GPS Coordinates |
| --- | --- |
| T1 | g8, g9, g10 |
| T2 | g11, g12, g13, g14 |

Other relevant data may also be recorded as part of the mapped data, and this may include, for example, time spent at each GPS coordinate, and/or the mode of travel involved during capture of this transition, such as for example "highway", "main road", "cross lane", "railway line" etc The time associated with each cellular network tower, when recorded, is called "location packet". Location packet may be recorded as time in the form of hours, minutes and seconds in a particular time zone associated with each cellular network tower. Alternately, location packet may be recorded as time elapsed from a predefined starting point for each cellular network tower. The predefined starting point may be a variety of trigger events, such as, but not limited to, start of a journey, start of a particular job, or any other event. Thus, location packet may be recorded as seconds elapsed, minutes, or hours elapsed from the trigger event for each cellular network tower.

Figure 3:
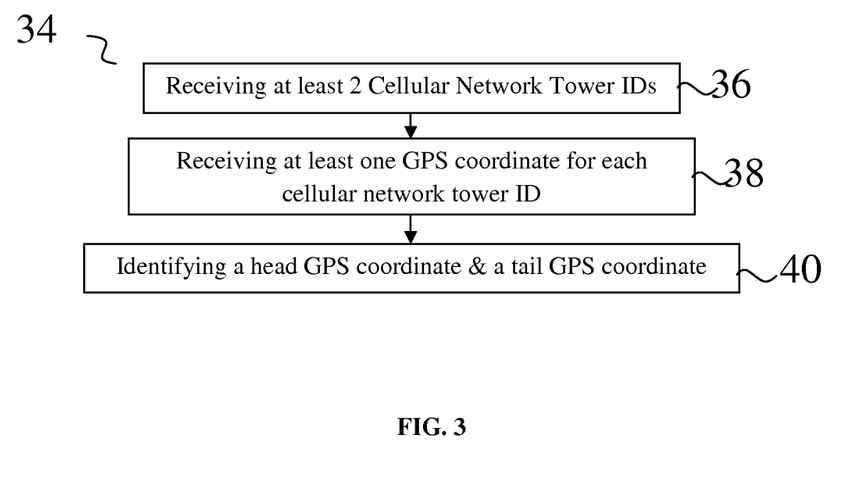
FIG. 3 is a flowchart representation of exemplary steps involved in the method of the invention for generating a tower transition data.

As noted herein, in one aspect, the invention provides a method for generating a tower transition data. Exemplary steps of the method of the invention are shown in FIG. 3 in a flowchart representation and generally depicted by numeral 34. The method comprises receiving at least two cellular network tower identity (ID), shown in FIG. 3 by numeral 36. The method then comprises receiving at least one GPS coordinate for each cellular network tower ID periodically, shown in FIG. 3 by numeral 38. As stated herein, the cellular network tower ID and the at least one GPS coordinate may be made available from a mobile communication device, or may be made available from two or more devices. The periodicity of receiving the at least one GPS coordinate depends on various factors, and may be, in one exemplary embodiment, 10 seconds, and in another exemplary embodiment, every 1 second, and in yet another exemplary embodiment, every 1 minute.

The method then involves identifying a head GPS coordinate and a tail GPS coordinate associated with at least one pair of cellular network tower IDs to generate tower transition data, shown by numeral 40 in FIG. 3. These steps may be repeated throughout the course of traversing by the mobile communication device. Thus, a set of GPS coordinates associated with a series of pairs of cellular network tower IDs may be obtained. Tower transition data may be represented in various ways. In one embodiment, the tower transition data is in a tabular form. Other forms of data representation may include graphical representation, in a text form, a comma separated value (csv) form, and the like, and combinations thereof. The tower transition data may then be stored in a suitable electronic form, such a text file ASCII file, and the like. Table 2 provides an example of how a tabular form of tower transition data based on the exemplary embodiment shown in FIG. 2.

TABLE 2

| Transition ID | Pair of cellular network towers involved in transition | 1st Tower ID | 2nd Tower ID | gchains |
| --- | --- | --- | --- | --- |
| TR1 | T1, T2 | T1 | T2 | g8, g9, g10, g11 |
| TR2 | T2, T1 | T2 | T1 | g14, g13, g12, g11, g10 |

For the data given in Table 2, the head GPS coordinate of Transition ID TR1 is g8 (the first coordinate associated with the first cellular network tower ID in the pair of cellular network towers) and the tail GPS coordinate of Transition ID TR1 is g11. Other relevant data may also be recorded as part of the mapped data, and this may include, for example, location packet, nature of path (railway line, highway, cross street, etc.), mode of transportation undertaken (train, bus, car, etc.), time of transition (which may include details such as hours, minutes, seconds, time zone), date of transition and the like, and combinations thereof.

As can be seen in Table 2, the direction of travel will also determine the sequence of gchains associated with the transition. Thus, the gchain associated with the transition TR1 for travel from Tower ID T1 to Tower ID T2 is different from the gchain associated with the transition TR2 in the reverse direction from Tower ID T2 to Tower ID T1.

One skilled in the art will also understand that the towers data and tower transition data may be constantly updated with new information that is made available. Thus, for example, in one path traversed by a mobile communication device, the cellular network tower ID associated with the path is T20, and the gchain includes g100, g101 and g102; while in another path traversed by another mobile communication device, the cellular network tower ID is T20, but the gchain includes g50, g51, g52 and g53; then the gcloud is updated to include all the gchains to associate with the cellular network tower ID. In a similar manner, the tower transition data is also updated to include any and all transitions between two cellular network tower IDs.

Figure 4:
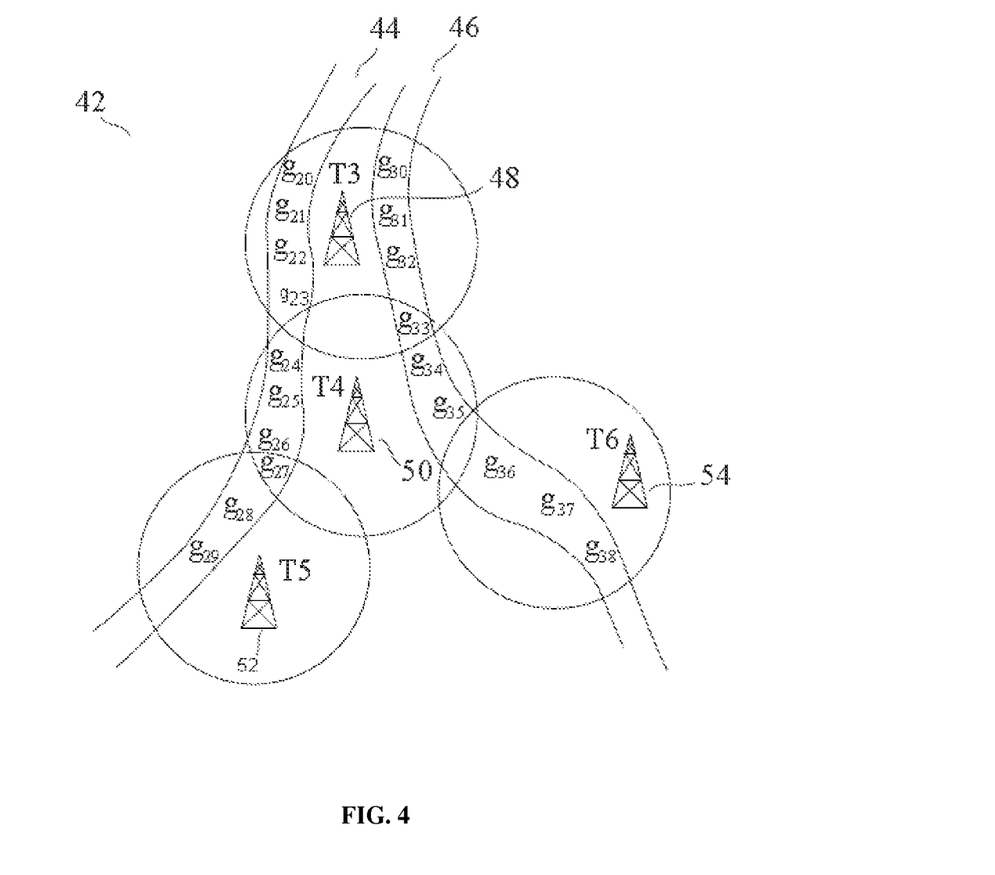
FIG. 4 is a diagrammatic representation showing the cellular towers and GPS co-ordinates on two paths taken by a mobile communication device to further explain the method of FIG. 3.

The method of the invention is further illustrated by the example given shown in FIG. 4, and depicted by numeral 42. In this illustration, a mobile communication device is shown to take two paths, Path A and Path B in the direction as described herein, depicted by numeral 44 and 46 respectively. Path A 44 and Path B 46 are shown to be served by cellular network tower IDs T3 (48) and T4 (50) initially, but subsequently diverge, wherein Path A is served by cellular network tower ID T5 (52) while Path B is served by cellular network tower ID T6 (54). An exemplary towers data is provided in Table 3. It should be noted that only some relevant portions of the data are shown in Table 3 for illustration purpose, and other important aspects associated with the towers table such as nature of path, location packet, mode of transportation etc. are not shown here.

TABLE 3

| Path | Tower ID | GPS Coordinates |
|------|----------|-----------------|
| A    | T3       | g20, g21, g22, g23, 24 |
|      | T4       | g24, g25, g26, g27, 28 |
|      | T5       | g28, g29 |
| B    | T3       | g30, g31, g32, g33, g34 |
|      | T4       | g34, g35, g36, 37 |
|      | T6       | g37, g38 |

An exemplary towers transition data may be generated from the towers data, shown in table 4.

TABLE 4

| Path | Transition ID | Cellular network towers involved in transition | GPS Coordinates | ghead | gtail |
|------|---------------|------------------------------------------------|-----------------|-------|-------|
| A    | TR3           | T3, T4                                         | g20, g21, g22, g23, g24 | g20   | g24   |
|      | TR4           | T4, T5                                         | g24, g25, g26, g27, g28 | g24   | g28   |
| B    | TR5           | T3, T4                                         | g30, g31, g32, g33, g34 | g30   | g34   |
|      | TR6           | T4, T6                                         | g34, g35, g36, g37 | g34   | g37   |

Table 3 shows that even though same set of towers may be used by a mobile communication device, when two different routes are taken, two different sets of GPS coordinates associated with each cellular network tower ID are generated for the towers table. Consequently, the towers transition table (Table 4) shows that the transition from one cellular network tower to the next cellular network tower has different coordinates for different paths taken. This is reflected by the different sets of ghead and gtail obtained for each transition as provided therein.

Figure 5:
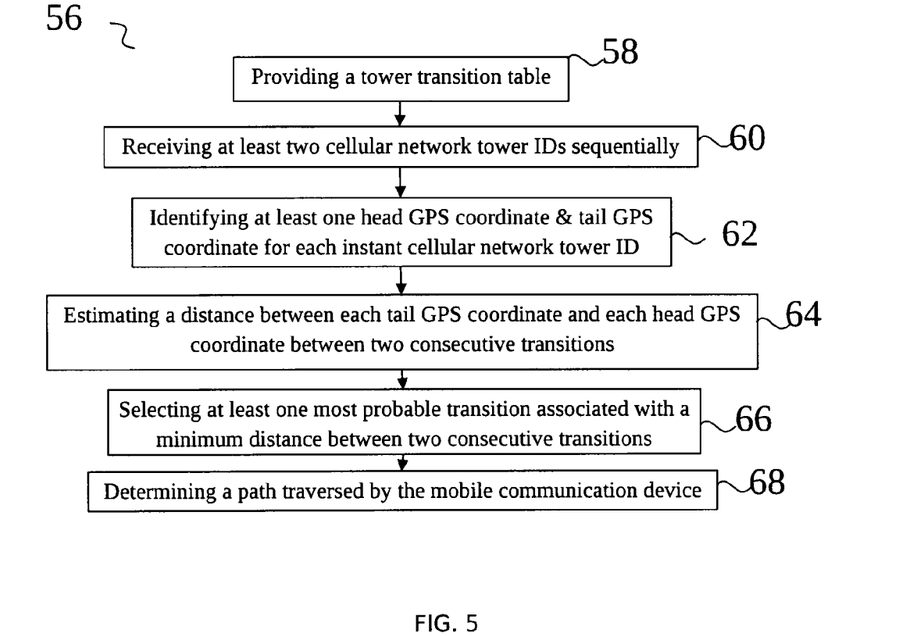
FIG. 5 is a flowchart representation of exemplary steps involved in the method of the invention for determining a path traversed by a mobile communication device.

As already noted, in another aspect, the invention provides a method of determining the path traversed by a mobile communication device. FIG. 5 shows exemplary steps involved in the method of the invention in a flowchart representation, wherein the method of the invention is depicted by numeral 56. The method comprises providing a tower transition data as described herein, depicted by numeral 58 in FIG. 5. The method then involves receiving at least two cellular network tower IDs sequentially, shown by numeral 60 in FIG. 5. As stated herein, the cellular network tower IDs may be recorded using features available on the mobile communication device or using an independent device. In one specific embodiment, the mobile communication device is used for recording the cellular network tower IDs.

The next step involves identifying at least one head GPS coordinate and at least one tail GPS coordinate associated with each transition between two consecutive cellular network tower IDs from the tower transition data, shown by numeral 62 in FIG. 5. The identification may be achieved as already described herein. In one exemplary embodiment, if a mobile communication device traverses through Path A shown in FIG. 4, the cellular network tower IDs received would be T3, T4 and T5 in that sequence. From this, the transitions can be recorded as T3:T4, T4:T5. The tower transition data shown in Table 4 provides two possible data points for the transition T3:T4 having (ghead, gtail) as follows: TR3 (g20,g24) and TR4 (g30,g34). For the subsequent transition T4:T5, the tower transition data of Table 4 has the transition TR4 as: (ghead,gtail): (g24,g28).

The method further comprises estimating a distance between each tail GPS coordinate and each head GPS coordinate between two consecutive transitions, represented by numeral 64 in FIG. 5. In the illustration shown in FIG. 4, the distance between the tails for transition TR3 in Table 4 and the head of TR4 in Table 4 is estimated, i.e. the distance between g24 and g24, and the distance between g34 and g24. Ideally, the estimated distance in the first instance between g27 and g27 would be zero, however, due to some variations in data recording and other experimental details, it may be non-zero. However, it is evident that the smallest distance between gtail and ghead of subsequent transitions, decides the most probable path taken.

The method further involves selecting at least one most probable transition associated with a minimum distance between two consecutive transitions, depicted by numeral 66 in FIG. 5. In the example of FIG. 4, the most probable transition selected would be that involving the transitions TR3 and TR4, as the distance between g24 and g24 would be minimum, as compared to the transitions T4 and TR3 (distance between g34 and g24 being greater than distance between g24 and g24). Selection of most probable transition may also make use of other relevant data from towers data such as mode of transportation, nature of path, and the like, and combinations thereof. For example, in an exemplary situation wherein a trip comprising 8 transitions has been recorded, if the most probable transition for the first four transitions and last 2 transitions has been found to involve a railway line, then the intermediate transitions may also be narrowed down to railway line in the nature of path taken by the mobile communication device. In this manner, the most probable transitions may be arrived at more quickly than when searching for the entire sequence of transitions and selecting the most probable transitions using distance computations alone. In a similar manner, mode of transportation may be taken into account to arrive at the most probable transition. Other factors may also be taken into account in the towers data and may be used to arrive at the most probable transition quite effectively. Combinations of data, such as distance computations, nature of path, mode of transportation, location packets etc. are all taken into account, which is then used to select the most probable transitions. The exact data to be used and the manner in which to obtain them will become obvious to one skilled in the art without undue experimentation.

Subsequently, the method involves determining the path traversed by the mobile communication device based on the at least one most probable transition, shown by numeral 68 in FIG. 5. For example, in the above case, the path being traversed can be determined to be the following GPS coordinates sequence: g20, g1, g22, g23, g24, g25, g26, g27, g28. Subsequently, the path traversed can be displayed in any suitable manner to facilitate easy interpretation, such as a plot on a map, or display in a tabular form, and the like, and combinations thereof.

If an observed transition does not exist in the tower transition data, then the gcloud, which comprises all the gchains associated with a particular cellular network tower, is used to arrive at the most probable transition. In this situation, the distance between the gtail of the last transition and the ghead of all the gchains in the gcloud of the particular cellular network tower ID is estimated, and the gchain associated with the minimum distance is used for selecting the most probable transition.

The most probable transition may also be chosen based on a pre-existing user profile. Thus, if a particular mobile communication device is associated with a user who has been profiled as to various activities, such as, but not limited to, typical routes taken, preferred route patterns (for example, routes with least number of traffic signals, or least distance between two points etc.), preferred mode of transportation, and the like, then the most probable transition may be refined using these inputs.

The method of the invention is very useful in determining accurately the path traversed by a mobile communication device. The method is also useful in determining the location of a mobile communication device. Further, it is also useful in accurately determining projected paths in the future from a given set of instant transitions. For instance, if the most probable transition is deduced based on a set of transitions transition belong to the same nature of path taken "rail route", then with the knowledge of the times at which the transitions occurred, the exact train on which the mobile communication device was carried on ma be determined based on a standard schedule of trains. Similarly, this method may be extended to any standard modes of transportation with fixed timings and stop points.

The most probable transition may also be refined using particular points of interest. Exemplary points of interest may be general to all users or may be specific to one or a set of users. General points of interest include, for example, popular tourist destinations, social interaction locations such as coffee shops, pubs, restaurants, malls, and the like. Specific points of interest may include, for example, home address, office address, and the like. In some embodiments, the user profile and the points of interest are interlinked to each other, that is, a user profile may be used to build points of interest or alternately, points of interest may be used to build user profile.

Further, using the method of the invention, it is possible to identify if a mobile communication device is stationary or in motion. If the mobile communication device is stationary the transition data forms a loop as it toggles between 2-3 values. The location is determined by the value on which most time has been spent. The number of cellular network towers between which a mobile communication device is seen to toggle to determine whether it is stationary depends on various factors, such as, but not limited to, density of callers, volume of calls at any given time, and the like. One skilled in the art may arrive at this number without undue experimentation. Consequently, once the number of cellular network towers associated with a stationary mobile communication device is identified, the number of cellular network towers that the mobile communication device toggles between while moving may be determined to be any number greater than that determined for the stationary situation. Thus, in one exemplary embodiment, if a mobile communication device is in contact with one cellular network tower for a period of 90 seconds or more, then it may be considered to stationary. In another exemplary embodiment, if a mobile communication device is in contact with 2-3 cellular network towers and is seen to toggle between those towers over a period of 120 seconds or more, then it may be considered to be stationary. In another alternate exemplary embodiment, if a mobile communication device is in contact with 4 distinct cellular network towers (i.e, 3 distinct tower transitions) without forming any loops (also called a "streak of 4"), then it is considered to be moving. The number of cellular network towers between which the mobile communication device is toggling and the time period to be considered to determine whether the mobile communication device is stationary or moving will vary depending on various factors such as density of callers, number of cellular network towers in that region, number of mobile communication devices in contact at that given point of time, and the like, and combinations thereof, and may be arrived at without undue experimentation by one skilled in the art. It would be obvious to one skilled in the art that the mobile communication device would loop between various cellular network towers even while stationary. Thus in these situations, if the mobile communication device is observed to be in contact with more number of cellular network towers than the observed number without forming a loop, then the mobile communication device is considered to be in motion.

The method of the invention can also provide a suitable path to be taken by a person given the start and end locations. The start and end locations may be provides as a set of GPS coordinates or may be in the form of landmarks which can be converted into a set of GPS coordinates. Subsequently, based on the available towers data and tower transition data, a complete path (in terms of cellular network towers) can be constructed. The construction of the path may be subjected to various constraints, such as shortest distance, least cost route, maximum highway route, and the like. One skilled in the art will understand that the path construction becomes more refined and accurate when the available tower transition data has been obtained from a statistically significant number of repetitions. The larger the number of repetitions, the more accurate the path constructed will be. Thus, the method encompassed in the invention is considered to be a self-learning method that leads to more accurate and faster results with increasing number of data points available.

One skilled in the art will recognize that the method of the invention may be advantageously effected as a software program tool. In such instances, the software program tool may be implemented using a computing device of suitable configuration, wherein the configuration is defined by parameters such as, but not limited to, processor speed, RAM space, storage drive memory space, storage space memory speed, and the like, and combinations thereof. The software program tool may also implemented as a downloadable program from a suitable location, such as a compact disc, a flash drive, a website, and the like. Suitable authorizations may also be made part of the usage of the software program, and may include various levels of use, such as, but not limited to, administrator, guest, manager, and the like. The software program may be enabled in the presence of a dongle. Many other variations will become obvious to one skilled in the art, and is contemplated to be within the scope of the invention. Thus, in yet another aspect, the invention provides a tool that uses the method of the invention to generate tower transition data, and a tool that uses the method of the invention to determine a path traversed by a mobile communication device.

Figure 6:
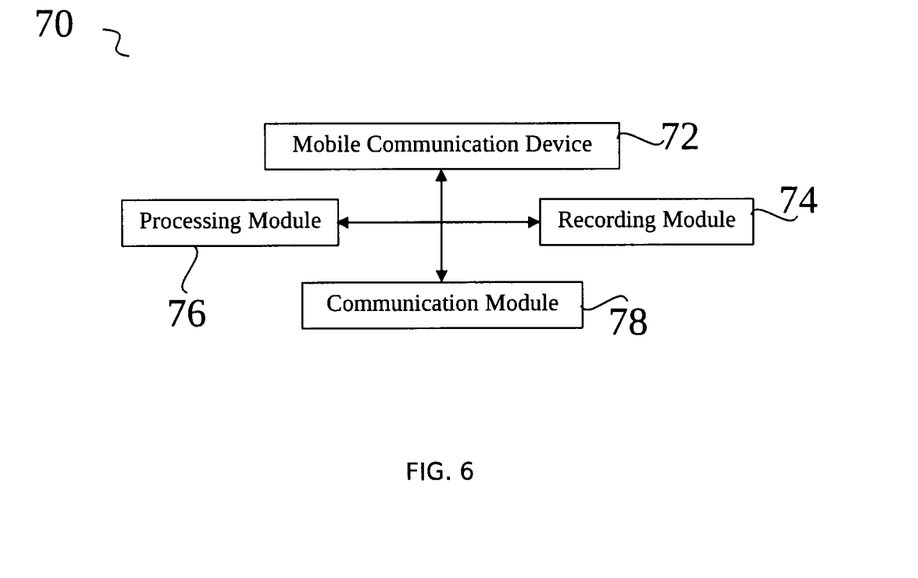
FIG. 6 is a block diagrammatic representation of the system of the invention.

In a further aspect, the invention provides a system, shown in FIG. 6 and represented by numeral 70 that comprises a mobile communication device 72. The system comprises a recording module 74 that is used to record at least two cellular network tower IDs. The recording module may be advantageously located on a computing device having suitable configuration to allow for recording the necessary information. Alternately, the recording module may be present on the mobile communication device itself, wherein the at least two cellular network tower IDs are recorded on the mobile communication device directly.

The system further comprises a processing module 76 to process the at least two cellular network tower IDs. The processing module 76 may also comprise the towers data and the tower transition data that are described herein. The processing module is configured to receive the instant cellular network tower IDs to determine the path traversed by the mobile communication device using the sequence of tower IDs and GPS coordinates using the method described herein. The processing module is configured to update the towers table and the towers transition table with any new data made available from the instant cellular network tower ID and the instant GPS coordinate made available from the mobile communication device. The processing module may be made available on a suitable computing device having the necessary processing capabilities to process the data and provide the output with sufficient speed and accuracy.

The system of the invention 70 also comprises communication module 78 which enables communication between the mobile communication device and the various modules described herein. The communication module may be present on a remote server, or may be integral to the mobile communication device. The manner of communication effected between various modules depend on the configuration of the system involved, and may include at least one of radio communication, infra-red, Bluetooth, through a GPRS network, wired LAN network, wireless network, and combinations thereof. In one exemplary embodiment, the mobile communication device communicates the GPS co-ordinates and cellular network tower ID to the recording module through the cellular network tower using GPRS. Alternately, the same information may be stored in the mobile communication device memory and subsequently transferred to the recording module at a later time through a connecting port, such as a USB cable. In one embodiment, the communication module, the recording module and the processing module are present on the same computing device, which has sufficient storage capacity to store the tower transition data, processing capacity to process the tower transition data, and appropriate communication protocols built into the computing device to enable communication between the various modules. In another embodiment, the recording module is made available on the mobile communication device and a computing device, wherein the computing device extracts the data from the mobile communication device on a periodic basis. Subsequently, the data is erased from the mobile communication device. In a particular embodiment, the computing device is a server having the appropriate capacities. In another particular embodiment, the processing module, recording module and the communication module is made available on a suitable mobile communication device. Other configurations will become obvious to one skilled in the art. Further, other modules such as output module and display module may be part of the system of the invention as appropriate, to display the output in a suitable manner, such as the path traversed by the mobile communication device in a graphical form.

Since mobile communication devices are very commonly available, with nearly every person carrying one on their person at all times, it is advantageous to track a person's location by tracking their personal mobile communication device. The invention provided herein uses this feature effectively, with its implementation also being cost effective, facile and extremely useful. The invention has a wide variety of uses. The manner of communication allows for unobtrusive tracking of a mobile communication device by an authorized third party. Also, certain actions by the mobile communication device may trigger some actions. This may include, for example, when a mobile communication device leaves a certain location or reaches a particular location, an alert could be effected to, for example, an authorized third party. The tracking itself may be effected by any of several means, and may include, a text message of an instant location to an authorized mobile communication device, a multimedia message of a graphical representation of path taken to an authorized mobile communication device, a text of various locations within a time period to a computer screen, locations overlaid on an existing map made available from a third party source, and the like.

Several use case scenarios are enabled by the invention. For example, a parent can track a child's movement, and become aware when the child is close to home, through for example, a text message received when the child reaches a particular location. In an alternate use case scenario, a manager can track a sales personnel as to the visits made, and the time spent at each sales visit location. In yet another situation, the location of a truck driver moving goods over long distances may be determined at any point using the method and the system of the invention. Further variations such as enabling of determination of path traversed only during working hours, and disabling of determination of path traversed during off-school hours, and the like, are also enabled using the method and system of the invention. The determination of path traversed and the location of the mobile communication device, and hence, its owner, is achieved in a completely unobtrusive manner, without involving the owner of the mobile communication device, thus ensuring that the owner is not distracted from the task they are currently involved in, such as driving. The path traversed by a mobile communication device as determined by the method of the invention requires less infrastructure in terms of equipment and instrument, (in most cases, only a mobile communication device is sufficient to obtain data for processing, and sufficient processing is also possible in several mobile communication device that are commercially available) and is still generally found to be more accurate than any of the other known methods in the art. Thus, the method and the system of the invention allows for very inexpensive and unobtrusive tracking of a user of a mobile communication device with a high degree of accuracy.

In yet another embodiment illustrating an exemplary use-case scenario for the method and the system of the invention, the location of the mobile communication device may further be estimated more accurately using other auxiliary components. For example, using a mobile communication device comprising a wifi device, if the location of the mobile communication device based on the at least one most probable transitions is found to be a known location such as 'home', then the wifi connectivity to an existing known wifi router at 'home' can be checked for. If the wifi device on the mobile communication device can lock onto the wifi router signal, then the location of the mobile communication device is ascertained to be 'home'. If the wifi device cannot read a signal from the wifi router, then the location can further be pinpointed to be 'close to home'.

In a further exemplary use-case scenario, the wifi device in a mobile communication device may be turned off until the location is estimated to be at a pre-defined location, such as 'home', 'office', etc. where such locations are known to have wifi connections. Other devices in the mobile communication device, such as Bluetooth, GPS receiver, and the like, may also be turned off and on depending on the location. This will save the battery life on the mobile communication device, thus extending its use life immensely.

While only certain features of the invention have been illustrated and described herein, many modifications and changes will occur to those skilled in the art. It is, therefore, to be understood that the appended claims are intended to cover all such modifications and changes as fall within the true spirit of the invention.

I claim:

1. A method for determining a path traversed by a mobile communication device, the method comprising:
   providing a tower transition data;
   receiving at least two cellular network tower IDs sequentially;
   identifying at least one head GPS coordinate and at least one tail GPS coordinate associated with each transition between two consecutive cellular network tower IDs from the tower transition data;
   estimating a distance between each tail GPS coordinate and each head GPS coordinate between two consecutive transitions; and
   selecting at least one most probable transition associated with a minimum distance between two consecutive transitions; and
   determining the path traversed by the mobile communication device based on the at least one most probable transition.

2. The method of claim 1 wherein the most probable transition is also determined based on user profile.

3. The method of claim 2 wherein the most probable transition is also determined based on at least one predefined point of interest.

4. The method of claim 1 wherein the tower transition data comprises at least one of location packet, mode of transportation, nature of path taken, time of transition, date of transition, or combinations thereof.

5. The method of claim 4 wherein the selecting the most probable transition is also based on at least one of location packet, mode of transportation, nature of path taken, time of transition, date of transition, or combinations thereof.

6. The method of claim 1 wherein the method is used to determine if the mobile communication device is moving or stationary.

7. The method of claim 1 wherein the tower transition data is in a tabular form.

8. A tool that uses the method of claim 1.

9. A system for determining path traversed by a mobile communication device, the system comprising:
   a mobile communication device in communication with at least one cellular network tower, wherein the mobile communication device is associated with at least one GPS coordinate;
   a recording module for recording the at least one cellular network tower ID;
   a processing module for processing the at least one cellular network tower ID, wherein the processing module comprises a tower transition data;
   a communication module to enable communication between the mobile communication device, the recording module and the processing module.

10. The system of claim 9 wherein the system is used to determine if the mobile communication device is moving or stationary.

11. The system of claim 9 wherein the tower transition data is in a tabular form.

12. The system of claim 9 wherein the processing module further comprises user profile.

13. The system of claim 9 wherein the processing module further comprises at least one predefined point of interest.

* * * * *